US010795419B2

(12) United States Patent
Zeng

(10) Patent No.: US 10,795,419 B2
(45) Date of Patent: Oct. 6, 2020

(54) FRONT PANEL ASSEMBLY

(71) Applicant: COOLER MASTER TECHNOLOGY INC., New Taipei (TW)

(72) Inventor: Yi-Hua Zeng, New Taipei (TW)

(73) Assignee: COOLER MASTER TECHNOLOGY INC., New Taipei (TW)

(*) Notice: Subject to any disclaimer, the term of this patent is extended or adjusted under 35 U.S.C. 154(b) by 315 days.

(21) Appl. No.: 15/926,914

(22) Filed: Mar. 20, 2018

(65) Prior Publication Data
US 2019/0212791 A1    Jul. 11, 2019

(30) Foreign Application Priority Data
Jan. 8, 2018    (CN) .................... 2018 2 0026604 U

(51) Int. Cl.
*G06F 1/18*    (2006.01)

(52) U.S. Cl.
CPC .................................... *G06F 1/181* (2013.01)

(58) Field of Classification Search
CPC ....................................................... G06F 1/181
See application file for complete search history.

(56) References Cited

U.S. PATENT DOCUMENTS

| 7,375,955 B2* | 5/2008 | Xu ........................... G06F 1/181 361/679.55 |
| 2007/0091555 A1* | 4/2007 | Lee ...................... H04B 1/3833 361/679.02 |
| 2007/0170825 A1* | 7/2007 | Chen ....................... G06F 1/181 312/223.2 |
| 2008/0123276 A1* | 5/2008 | Lin .......................... G06F 1/181 361/727 |
| 2008/0151508 A1* | 6/2008 | Chen ....................... G06F 1/181 361/724 |
| 2009/0086088 A1* | 4/2009 | Lee ........................ G06F 1/1626 348/374 |
| 2009/0147453 A1* | 6/2009 | Hsieh .................... G06F 1/1656 361/679.02 |
| 2009/0154080 A1* | 6/2009 | Lee ......................... G06F 1/181 361/679.02 |
| 2010/0052484 A1* | 3/2010 | Wang ..................... G06F 1/187 312/223.2 |
| 2011/0260595 A1* | 10/2011 | Huang .................... G06F 1/181 312/322 |
| 2012/0056520 A1* | 3/2012 | Liu .......................... G06F 1/181 312/312 |

* cited by examiner

Primary Examiner — Hung S. Bui
Assistant Examiner — Sagar Shrestha
(74) Attorney, Agent, or Firm — Maschoff Brennan

(57) ABSTRACT

The disclosure provides a front panel assembly adapted for a computer case. The front panel assembly includes a frame, a slidable cover and at least one torsion spring. The slidable cover is slidably disposed on the frame and slidable between a covering position and an exposing position. The at least one torsion spring is connected to and located between the frame and the slidable cover so as to provide elastic energy to spring the slidable cover to the covering position or the exposing position while the slidable cover is slide on the frame.

12 Claims, 9 Drawing Sheets

FRONT PANEL ASSEMBLY

CROSS-REFERENCE TO RELATED APPLICATIONS

This non-provisional application claims priority under 35 U.S.C. § 119(a) on Patent Application No(s). 201820026604.7 filed in China on Jan. 8, 2017, the entire contents of which are hereby incorporated by reference.

TECHNICAL FIELD

The disclosure relates to a front panel assembly, more particularly to a front panel assembly for a computer case.

BACKGROUND

Computer manufacturing is an evolving industry, in addition to the quality, performance, and price of a new computer, its appearance has become an important factor for consumer decision-making. Thus, manufacturers have increased their focus on improving not only the performance but also the appearance, in order to attract more consumers.

Generally, a desktop computer has a metal box-shaped casing which is consisted of a frame, side panels, and a front panel. These panels are mounted on the frame to form an internal space for accommodating required electrical components. In most cases, the front panel has many input/output ports and an insertion slot for the optical disk drive. Some manufacturers change the material or the texture of the front panel to change the overall appearance of the casing. Alternatively, some use a slidable cover to replace the conventional front panel. The slidable cover not only can increase the casing's visual effects but also can prevent dust from entering into the casing. However, in the prior art, the slidable cover is operated manually, thus it is easy to forget to close the slidable cover once it has been opened.

SUMMARY

Accordingly, the present disclosure provides a front panel assembly which not only can change the appearance but also can provide additional features.

One embodiment of the disclosure provides a front panel assembly adapted for a computer case. The front panel assembly includes a frame, a slidable cover and at least one torsion spring. The slidable cover is slidably disposed on the frame and slidable between a covering position and an exposing position. The at least one torsion spring is connected to and located between the frame and the slidable cover so as to provide elastic energy to spring the slidable cover to the covering position or the exposing position while the slidable cover is slide on the frame.

One embodiment of the disclosure provides a front panel assembly adapted for a computer case. The front panel assembly includes a frame, a slidable cover, a first torsion spring and a second torsion spring. The frame, has an input/output interface. The slidable cover is slidably disposed on the frame and slidable between a covering position and an exposing position. The first torsion spring is connected to and located between the frame and the slidable cover. The second torsion spring is connected to and located between the frame and the slidable cover. The first torsion spring and the second torsion spring are respectively disposed on two opposite sides of the frame so as to provide elastic energy to spring the slidable cover to the covering position or the exposing position; when the slidable cover is in the covering position, the slidable cover covers the input/output interface; when the slidable cover is in the exposing position, the slidable cover exposes the input/output interface.

One embodiment of the disclosure provides a front panel assembly adapted for a computer case. The front panel assembly includes a frame, a slidable cover and at least one restoring member. The slidable cover is slidably disposed on the frame along a slide direction. The at least one restoring member is disposed between the frame and the slidable cover so as to provide a first restoring force or a second restoring force on the slidable cover, the first restoring force is used to keep the slidable cover in a covering position to press against the frame, and the second restoring force is used to keep the slidable cover in an exposing position to press against the frame. A direction of the first restoring force, a direction of the second restoring force and the slide direction are coplanar.

According to the front panel assembly as discussed in above, the slidable cover can increase the visual effect of the computer case.

In addition, with the assist of the torsion spring or the restoring member, the slidable cover is able to be sprung to desired positions, thereby improving operability and convenience for users.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
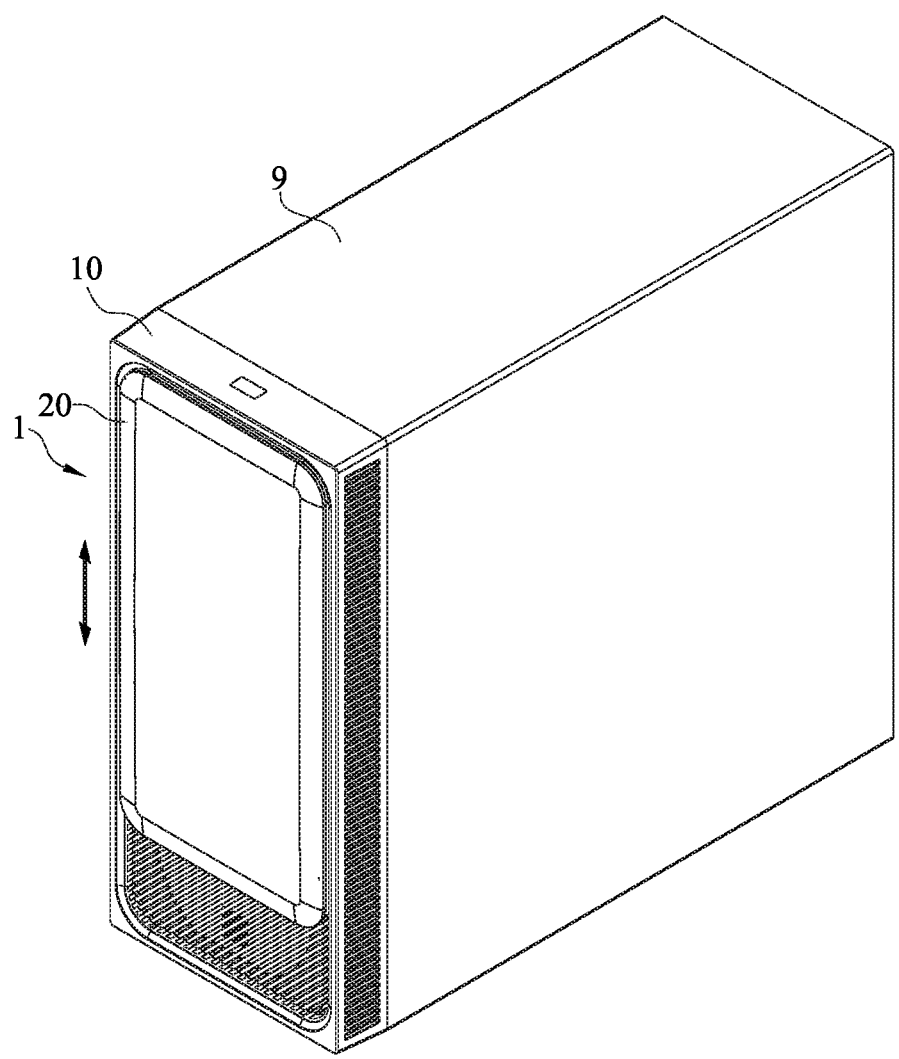
FIG. 1 is a perspective view of a front panel assembly of a computer case according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

Figure 2:
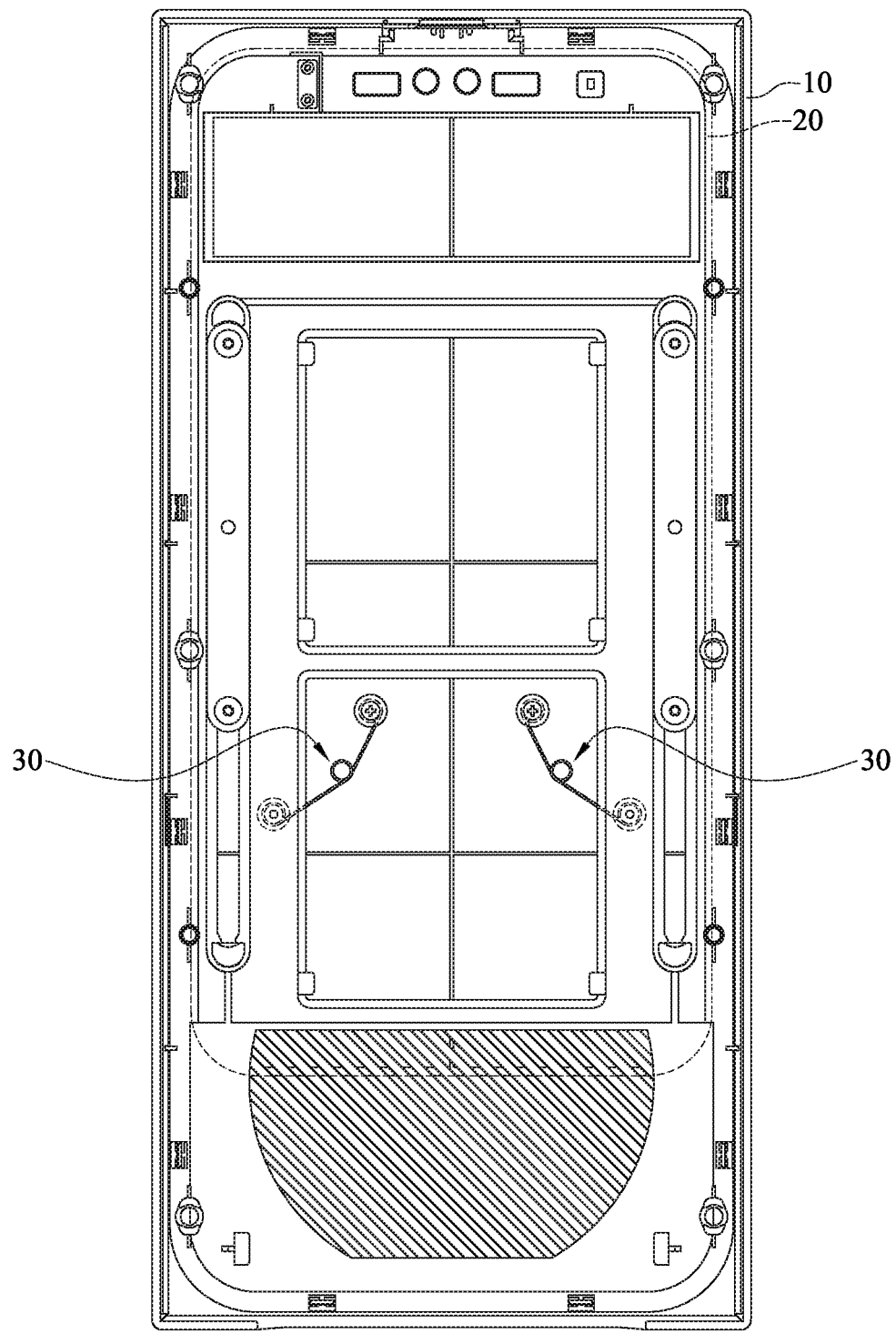
FIG. 2 is a rear view of the front panel assembly in FIG. 1.
Figure 3:
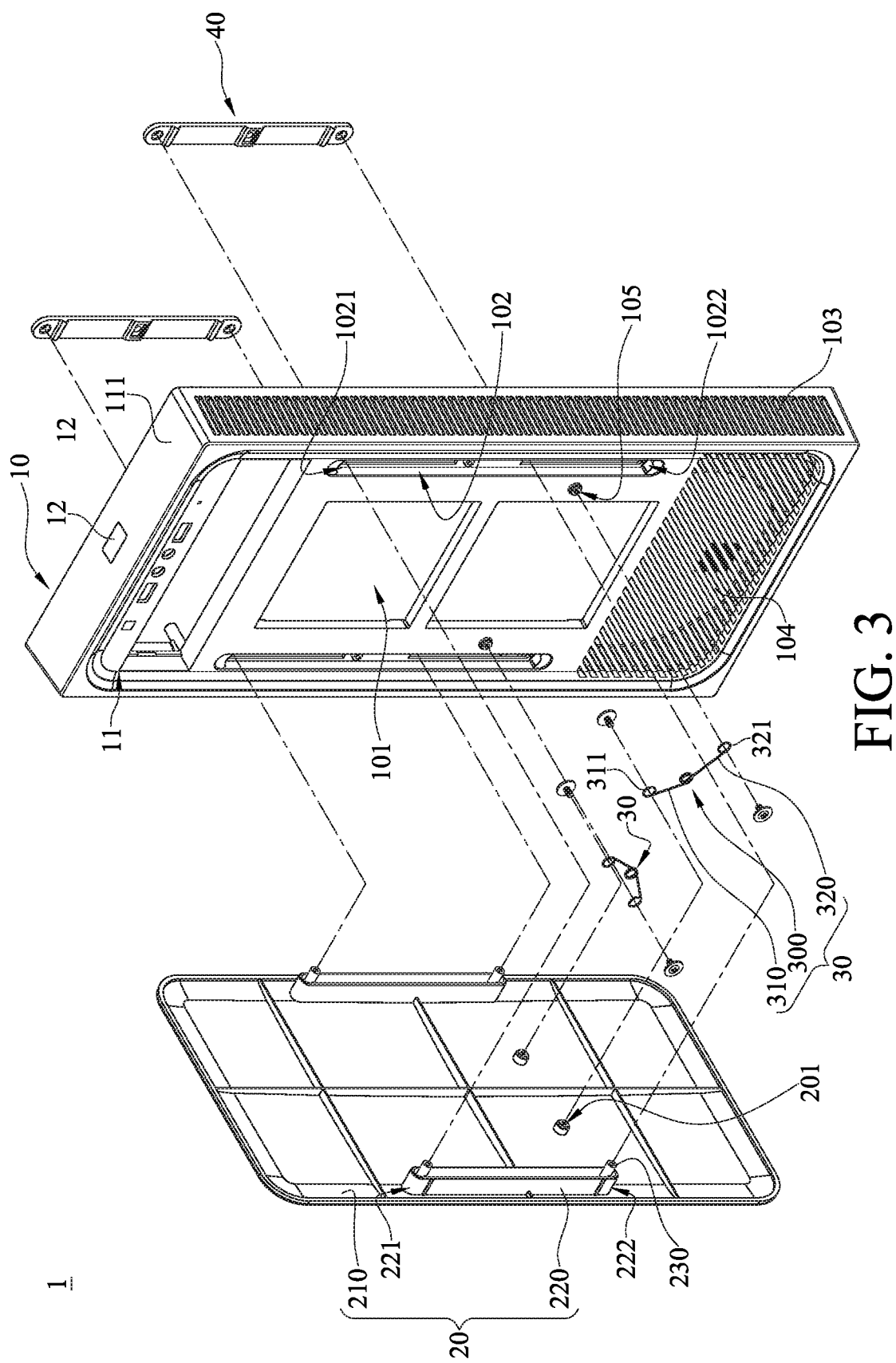
FIG. 3 is an exploded view of the front panel assembly in FIG. 1.

Firstly, please refer to FIGS. 1-3. FIG. 1 is a perspective view of a front panel assembly of a computer case according to one embodiment of the disclosure, FIG. 2 is a rear view of the front panel assembly in FIG. 1, and FIG. 3 is an exploded view of the front panel assembly in FIG. 1.

This embodiment provides a front panel assembly 1 which is adapted to be mounted on a front side of a computer case 9. The computer case 9 is a part of the casing of a computer. The front panel assembly 1 and the computer case 9 can be assembled together to form the casing of a computer. However, the front panel assembly 1 is not limited to be mounted on the computer case 9. In some other embodiments, the front panel assembly 1 may be mounted on a casing of other electronic devices. The following paragraphs focus on descripting the front panel assembly 1.

In this embodiment, the front panel assembly 1 includes a frame 10, a slidable cover 20 and a pair of restoring members 30.

The frame 10 has an interface 11 and a power switch 12. The interface 11 has a plurality of input/output ports (I/O ports) (not numbered) of different configurations and an insertion slot (not numbered) for the installation of an optical disk drive (not shown in figures). Thus, the interface 11 is also called an input/output interface. The power switch 12 is disposed a top surface 111 of the frame 10, and it is a button used to turn on/off the computer.

In addition, the frame 10 further has a plurality of openings 101, a pair of slide grooves 102, air vents 103 and air vents 104.

The openings 101 penetrate through the middle part of the frame 10. The openings 101 can help to lightweight the frame 10 and strengthen the structure of the frame 10. However, the openings 101 are optional, and its quantity and shape are also not restricted. For example, in some other embodiments, the frame may have no opening. In another embodiment, the frame may have only one opening, and its shape can be different from that of the previous embodiment.

The slide grooves 102 are respectively located at two opposite sides of the frame 10. In other words, the slide grooves 102 are respectively located at two opposite sides of the openings 101. In this embodiment, each of the slide grooves 102 has a first end 1021 and a second end 1022 opposite to each other. As shown in figures, the first end 1021 is the top end of the slide groove 102, and the second end 1022 is the bottom end of the slide groove 102.

The air vents 103 are formed on two opposite walls of the frame 10, and are used to transfer air to and from the frame 10. However, the air vents 103 are optional, and its quantity and shape are not restricted as well.

The air vents 104 are located at the bottom side of the openings 101, and are also used to transfer air to and from the frame 10. However, the air vents 104 are also optional, and its quantity and shape are not restricted.

The slidable cover 20 includes a covering part 210 and a pair of sliding parts 220. The sliding parts 220 protrude from a surface of the covering part 210 facing the frame 10, and the two sliding parts 220 are respectively located at two opposite sides of the covering part 210. The sliding parts 220 are respectively slidably located in the slide grooves 102 of the frame 10. By this configuration, the slidable cover 20 is slidably disposed on the frame 10 in a slide direction A.

Furthermore, in this embodiment, each sliding part 220 has two guide protrusions 230 that penetrate through the slide groove 102 of the frame 10 and are fixed to an attachment 40 located at the opposite side of the frame 10. This configuration ensures the sliding of the slidable cover 20 without coming off. However, the present disclosure is not limited thereto. It is noted that any design that can achieve the slide movement of the slidable cover on the frame falls within the scope of the disclosure.

The restoring members 30 are connected to and located between the frame 10 and the slidable cover 20. However, it is noted that the quantity of the restoring member 30 is not restricted. For example, in some other embodiments, the front frame assembly only includes one torsion spring. In addition, in this or some other embodiments, each restoring member 30 is a torsion spring, so it can also be called a torsion spring 30 in these embodiments. The torsion spring 30 includes a coil part 300, a first arm part 310 and a second arm part 320. The first arm part 310 and the second arm part 320 are respectively connected to two opposite sides of the coil part 300. Normally, the coil part 300 keeps the first arm part 310 and the second arm part 320 spread apart from each other. In this embodiment, the first arm part 310 has a movable end 311 away from the coil part 300, and the second arm part 320 has a fixed end 321 away from the coil part 300. In other word, the movable end 311 and the fixed end 321 are two opposite ends of the torsion spring 30. The movable end 311 is fixed on a screw hole 201 of the slidable cover 20 through, for example, a fastener (not numbered). The fixed end 321 is fixed on a screw hole 105 of the frame 10 through, for example, a fastener (not numbered). Thus, the movable end 311 can be moved with the slidable cover 20. It is understood that the moving direction of the movable end 311 is parallel to the slide direction A of the slidable cover 20.

When a force is applied on the first arm part 310 and/or the second arm part 320 to force the movable end 311 and the fixed end 321 to come close to each other; or when a force is applied on the first arm part 310 and/or the second arm part 320 to reduce the angle between the first arm part 310 and the second arm part 320 (i.e. the angle of the torsion spring 30), the first arm part 310 and the second arm part 320 would force the coil part 300 to deform and wind tightly so as to store energy (i.e. elastic energy or torsion energy). In this embodiment, the torsion spring 30 has a released state and a pressed state. The released state means a state of the torsion spring 30 when the first arm part 310 and the second arm part 320 are relatively spread apart from each other. The pressed state means a state of the torsion spring 30 when it is loaded causing the first arm part 310 and the second arm part 320 to relatively close to each other.

In this embodiment, the two torsion springs 30 are located symmetrically to a central line of the frame 10.

Moreover, in this embodiment, the screw holes 105 is not located at the middle of the slide groove 102. Specifically, for each screw hole 105, a distance between the screw hole 105 and the slide groove 102 is different from a distance between the screw hole 105 and the second end 1022. In more detail, the screw hole 105 is closer to the second end 1022 of the slide groove 102, such that the distance between the screw hole 105 and the first end 1021 is larger than the distance between the screw hole 105 and the second end 1022. In other word, the fixed end 321 of the torsion spring 30 is closer to the second end 1022 of the slide groove 102 then the movable end 311. Also, in this embodiment, the screw holes 201 are not located at the middle of the sliding part 220. Specifically, each sliding part 220 has a first end 221 and a second end 222, the first end 221 is the top end of the sliding part 220, the second end 222 is the bottom end of the sliding part 220, and the screw hole 201 is closer to the second end 222 than the first end 221, such that a distance between the screw hole 201 and the first end 221 is larger than a distance between the screw hole 201 to the second end 222. In other word, the movable end 311 of the torsion spring 30 is closer to the second end 222 of the sliding part 220.

In this embodiment, the torsion springs 30 are able to provide elastic energy (taken as a restoring force for the slidable cover 20) to move the slidable cover 20 to two predetermined positions—a covering position and an exposing position.

Figure 4A:
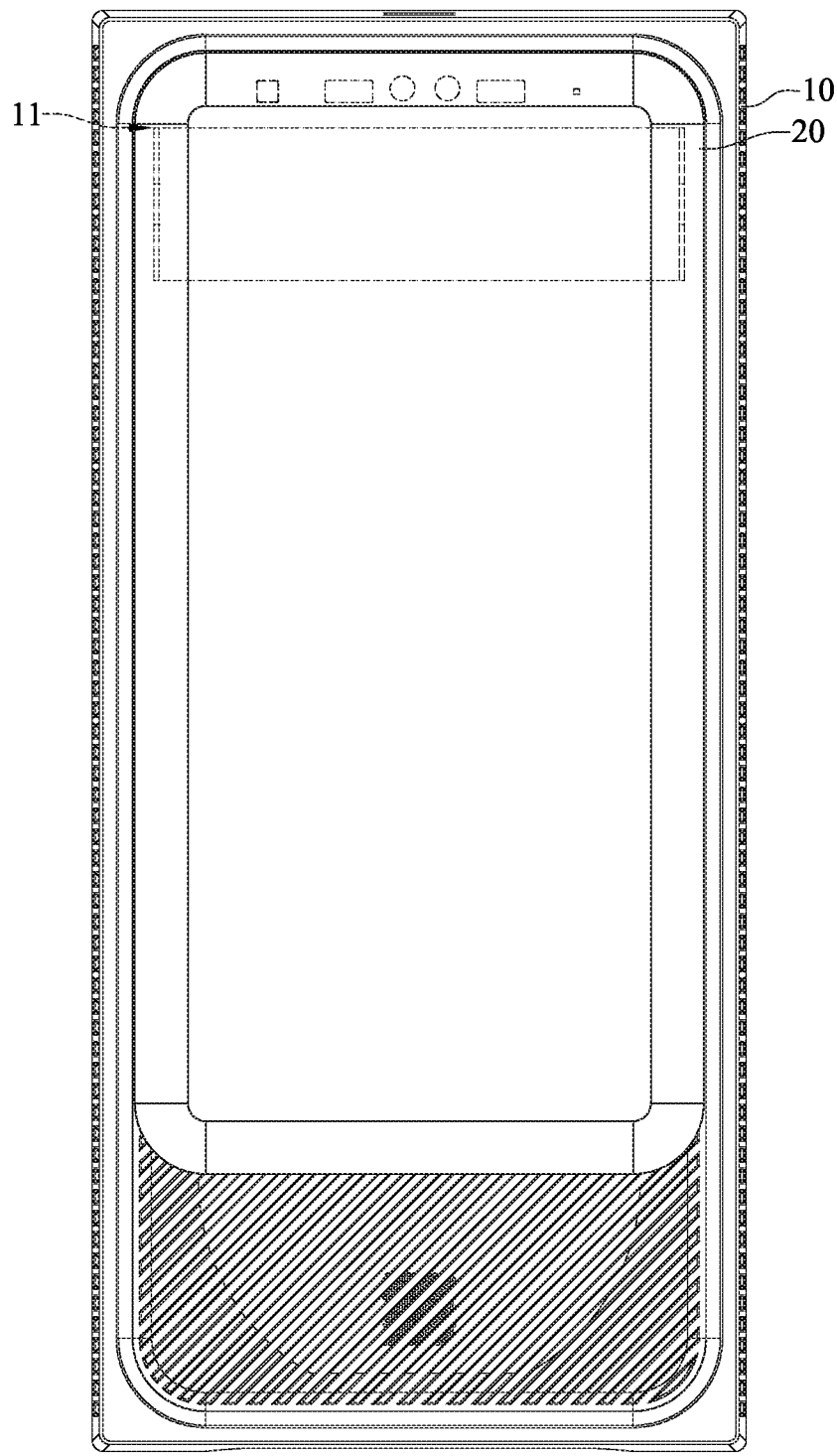
FIG. 4A is a front view of the front panel assembly in FIG. 1 when its slidable cover is in a covering position.
Figure 4B:
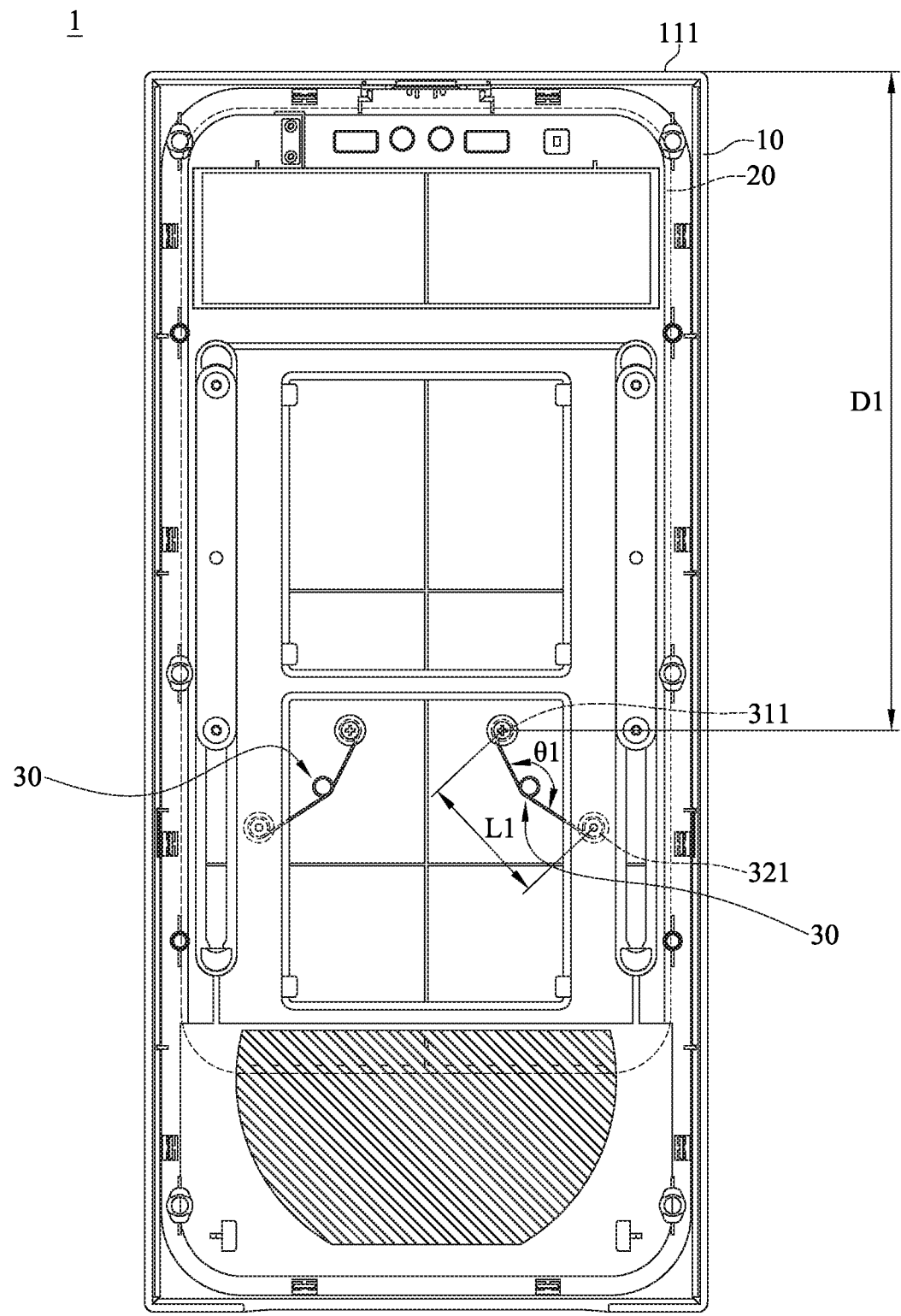
FIG. 4B is a rear view of the front panel assembly in FIG. 4A.

Please further refer to FIGS. 4A-4B. FIG. 4A is a front view of the front panel assembly in FIG. 1 when its slidable cover is in a covering position, and FIG. 4B is a rear view of the front panel assembly in FIG. 4A.

As shown in FIGS. 4A-4B, the slidable cover 20 is in the covering position. At this moment, the slidable cover 20 covers the input/output interface 11 of the frame 10, so it can prevent dust from entering into the mount holes of the input/output interface 11. In addition, when the slidable cover 20 is in the covering position, the torsion spring 30 is in the released state, such that the coil part 300 can continuously keep the first arm part 310 and the second arm part 320 spread apart from each other so as to continuously force the slidable cover 20 to press against the frame 10 and be in the covering position. As shown in FIG. 4B, it shows a distance L1 between the movable end 311 and the fixed end 321, an angle θ1 between the first arm part 310 and the second arm part 320 (can also simply be called the angle of the torsion spring 30), and a distance D1 between the movable end 311 and the top surface 111 of the frame 10.

Figure 5A:
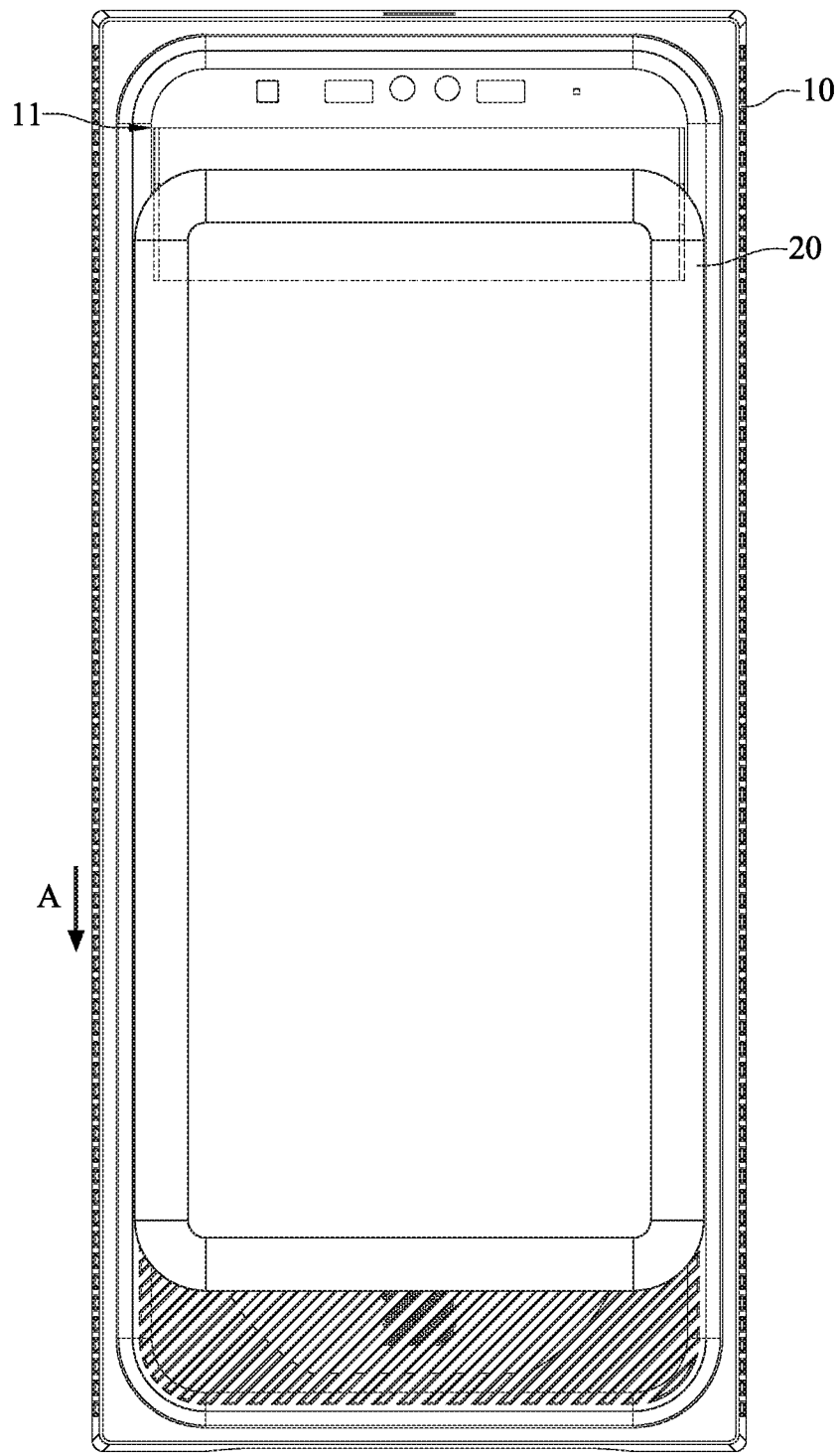
FIG. 5A is a front view of the front panel assembly in FIG. 1 when the slidable cover is located between the covering position and an exposing position.
Figure 5B:
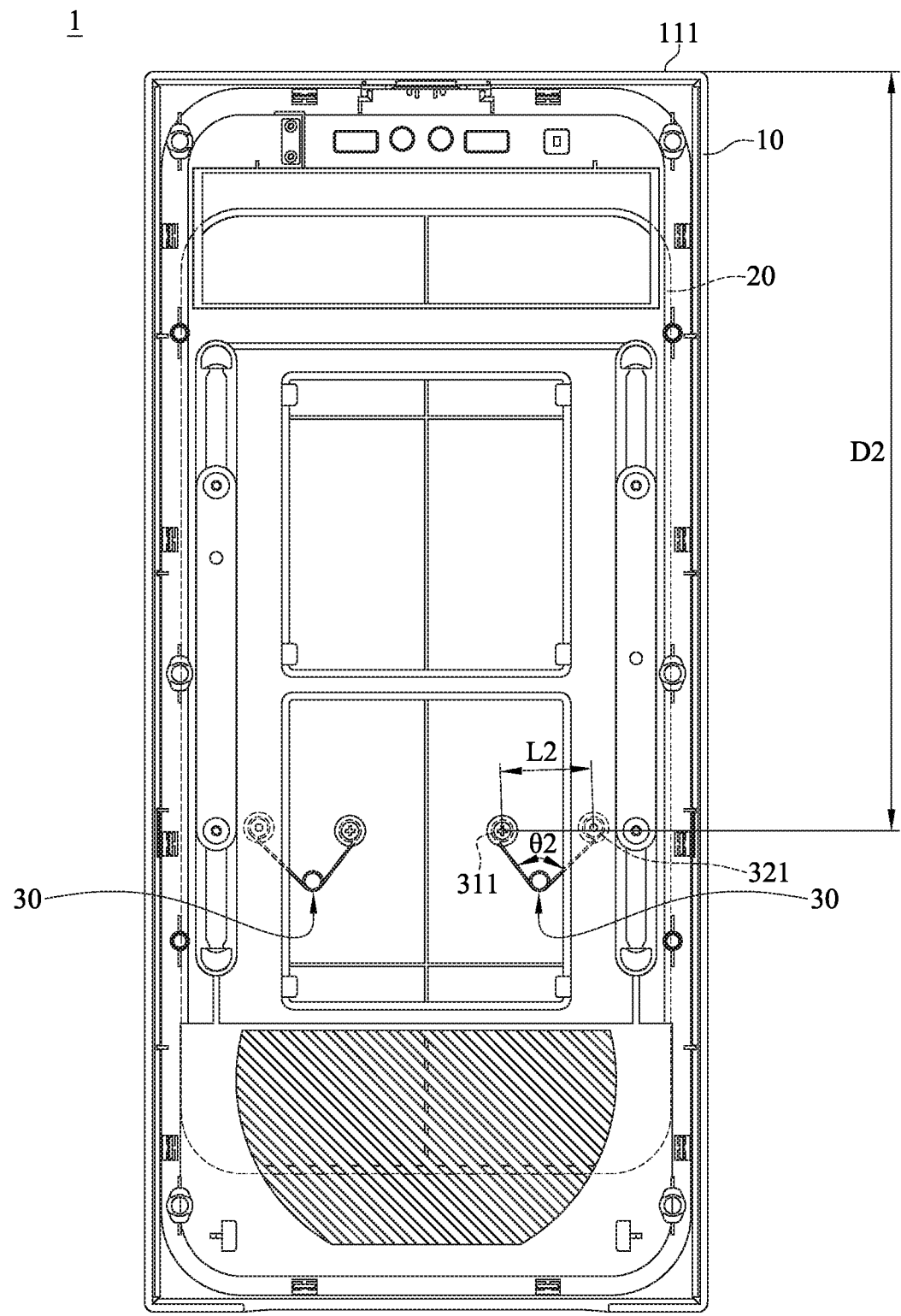
FIG. 5B is a rear view of the front panel assembly in FIG. 5A.

Then, please further refer to FIGS. 5A-5B. FIG. 5A is a front view of the front panel assembly in FIG. 1 when the slidable cover is located between the covering position and an exposing position, and FIG. 5B is a rear view of the front panel assembly in FIG. 5A.

As shown in FIGS. 5A-5B, the slidable cover 20 is slide downward along the slide direction A so as to be moved away from the covering position and to gradually expose the input/output interface 11. At this moment, the slidable cover 20 is moved to a middle position which is between the covering position and the exposing position. As shown in FIG. 5B, the movement of the slidable cover 20 from the covering position to the middle position forces the movable end 311 of the torsion spring 30 to move downward and close to the fixed end 321. During this movement, the distance between the movable end 311 and the top surface 111 of the frame 10 is increased from D1 to D2, and the angle between the first arm part 310 and the second arm part 320 is decreased from θ1 to θ2, forcing the torsion spring 30 to be transformed into the pressed state from the released state so as to cause the coil part 300 to deform and to store elastic energy. That is, when the slidable cover 20 is in the middle position, the torsion spring 30 is in the pressed state. And while the slidable cover 20 is sliding from the covering position to the middle position, the change of the distance between the movable end 311 of the torsion spring 30 and the top surface 111 of the frame 10, and the change of the angle between the first arm part 310 and the second arm part 320 (i.e. the change of the angle of the torsion spring 30) are in inverse proportion. In other word, the distance is increased as the angle is decreased. In addition, during this movement of the slidable cover 20, the distance between the movable end 311 and the fixed end 321 is decreased from L1 to L2. It is noted that the released state is a state of the torsion spring 30 when the first arm part 310 and the second arm part 320 are spread apart from each other, compared to the pressed state being a state of the torsion spring 30 when the first arm part 310 and the second arm part 320 are close to each other. Thus, when the torsion spring 30 is not loaded, it is defined as being in the released state. Even when the torsion spring 30 is loaded with a small force to cause the first arm part 310 and the second arm part 320 to slightly move toward to each other, it can also be defined as being in the released state. On the other hand, when the torsion spring 30 is loaded to its limit, it is defined as being in the pressed state. Even when the torsion spring 30 is heavily loaded but the first arm part 310 and the second arm part 320 can still be moved closer, it can also be defined as being in the pressed state.

Figure 6A:
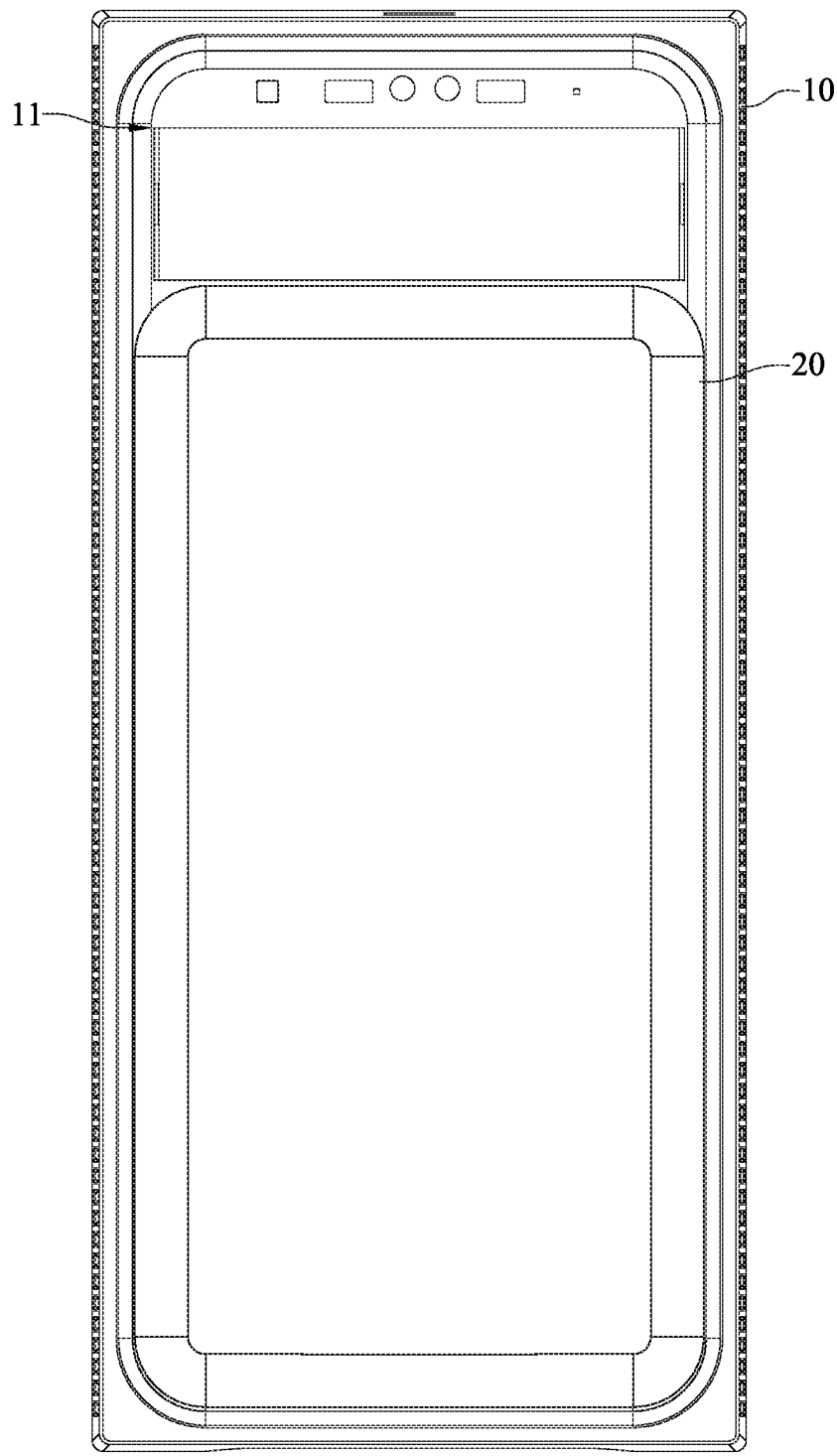
FIG. 6A is a front view of the front panel assembly in FIG. 1 when the slidable cover is in the exposing position.
Figure 6B:
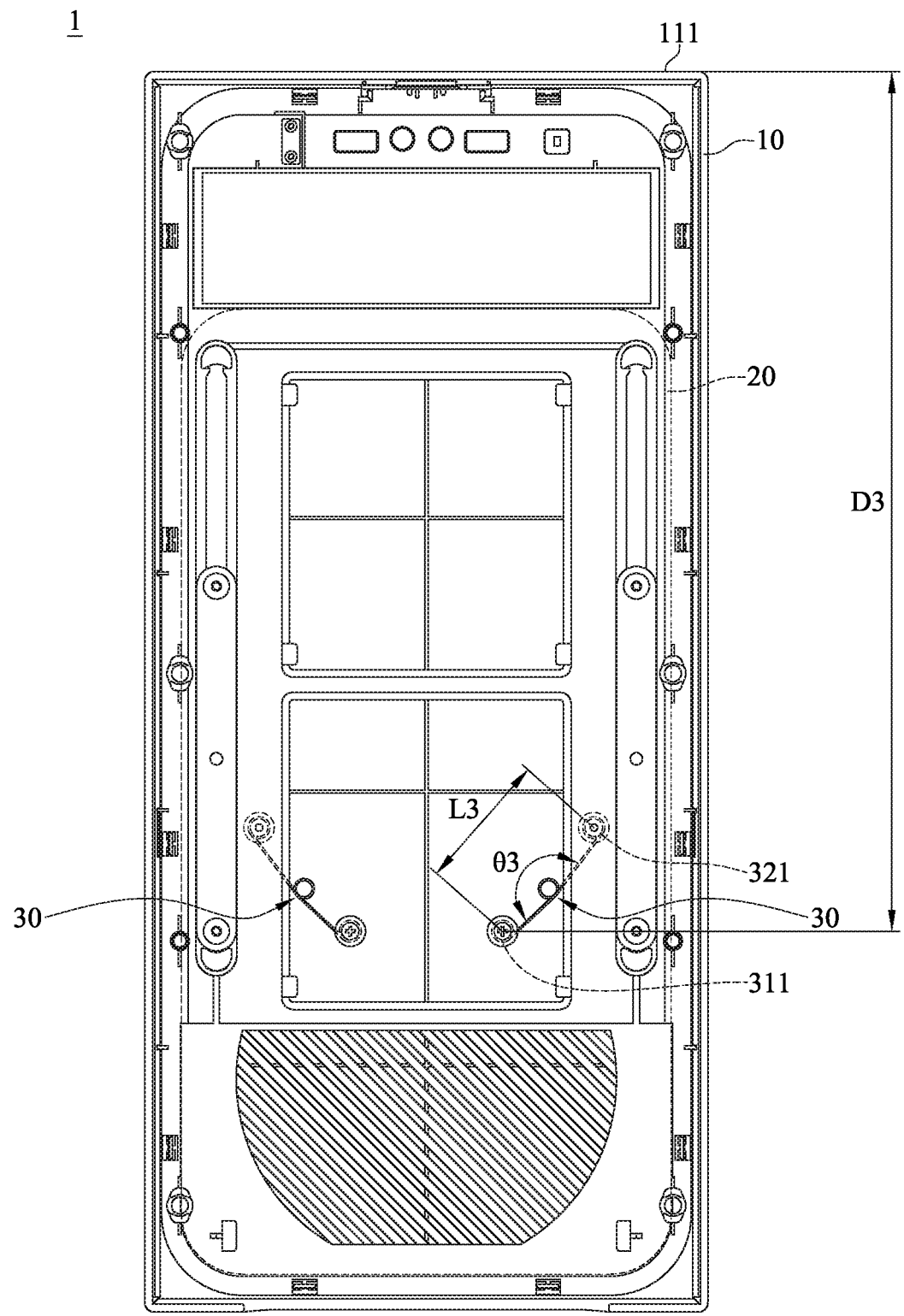
FIG. 6B is a rear view of the front panel assembly in FIG. 6A.

Then, please further refer to FIGS. 6A-6B. FIG. 6A is a front view of the front panel assembly in FIG. 1 when the slidable cover is in the exposing position, and FIG. 6B is a rear view of the front panel assembly in FIG. 6A.

As shown in FIGS. 6A-6B, while the slidable cover 20 is moved from the position in FIG. 5A toward the position in FIG. 6A, the torsion spring 30 is able to transform back to the released state. During this movement of the slidable cover 20, the coil part 300 of the torsion spring 30 releases the elastic energy to force the first arm part 310 and the second arm part 320 to spread apart from each other, such that the movable end 311 of the torsion spring 30 springs the slidable cover 20 to the exposing position. While springing the slidable cover 20 to the exposing position, the distance between the movable end 311 and the top surface 111 of the frame 10 is increased from D2 to D3, and the angle between the first arm part 310 and the second arm part 320 is increased from θ2 to θ3. That is, when the slidable cover 20 is sprung from the middle position to the exposing position, the change of the distance, between the movable end 311 and the top surface 111 of the frame 10, and the change of the angle, between the first arm part 310 and the second arm part 320, (i.e. the change of the angle of the torsion spring 30) are in proportion. In other word, the distance is increased as the angle increases. During this movement of the slidable cover 20, the distance between the movable end 311 and the fixed end 321 is increased from L2 to L3. Thus, when the slidable cover 20 is in the exposing position, the torsion spring 30 is in the released state, and the slidable cover 20 can completely expose the input/output interface 11. Also, when the slidable cover 20 is in the exposing position, the coil part 300 also can continuously keep the first arm part 310 and the second arm part 320 spread apart from each other so as to continuously force the slidable cover 20 to press against the frame 1 and be in the exposing position.

In the reverse operation, for example, when the slidable cover 20 is being attempted to be slide back into the covering position, it only needs to apply an initial force on the slidable cover 20 in a direction toward the position shown in FIG. 5A, and then the slidable cover 20 will be automatically sprung back to the covering position.

It is noted that the torsion spring 30 can generate elastic energy taken as the restoring force for sliding the slidable cover 20 to desired positions, for example, the covering position to cover the input/output interface 11, and the exposing position to expose the input/output interface 11. In addition, with the assist of the torsion spring 30, the slidable cover 20 can be kept in the covering position or the exposing position.

To describe in another way, one of the restoring member 30 (i.e. the torsion spring 30) can generate a first restoring force and a second restoring force. The first restoring force is for moving the slidable cover 20 to the covering position or keeping the slidable cover 20 in the covering position, and the second restoring force is for moving the slidable cover 20 to the exposing position or keeping the slidable cover 20 in the exposing position. It is understood that the directions of the first restoring force and the second restoring force are parallel to the slide direction A of the slidable cover 20, and these directions are coplanar. Similarly, the other restoring member 30 (i.e. the other torsion spring 30) can generate a third restoring force and a fourth restoring force to move the slidable cover 20 to or keep the slidable cover 20 in the desired positions, and the directions of the first to fourth restoring force and the slide direction A of the slidable cover 20 are parallel to one another and are coplanar.

In addition, in each torsion spring 30, the movable end 311 is closer to the second end 222 of the sliding part 220, and the fixed end 321 is closer to the second end 1022 of the slide groove 102; that is, the torsion spring 30 is closer to the exposing position of the slidable cover 20 (that is, the torsion spring 30 is closer to the bottom of the frame 10). In such a case, the deformation amount of the torsion spring 30 when the slidable cover 20 is in the exposing position is less than that when the slidable cover 20 is in the covering position; that is, the distance L3 is less than the distance L1. Therefore, the deformation amount of the torsion spring 30 while the slidable cover 20 is sliding back to the covering position from the exposing position is less than that while the slidable cover 20 is sliding back to the exposing position from the covering position; that is, when the slidable cover 20 is attempted to be slide back to the covering position from the exposing position, it requires lesser force to deform the torsion spring 30. So the users can use lesser force to slide the slidable cover 20 upward to the covering position to cover the input/output interface 11. On the other hand, when the slidable cover 20 is attempted to be slide downward to the exposing position from the covering position, the movement of the slidable cover 20 requires larger force to deform the torsion spring 30, but the users still can easily deform the torsion spring 30 because they can deform the torsion spring 30 with the assist of moving the center of their body.

Furthermore, the power switch 12 is disposed on the top surface 111 of the frame 10 but not in the interface 11, so when it is attempted to turn on/off the computer, users can directly press the power switch 12 without sliding the slidable cover 20, and this helps to reduce the chance of dust-entering to the input/output ports.

In contrast, the conventional slidable cover not only covers the input/output ports but also the power switch when it is closed, so the user need to open the slidable cover when they want to touch the power switch. But since the conventional slidable cover is operated manually, it may lead the users to easily forget to slide the slidable cover back into the original position once it has been opened, leaving the input/output ports exposed, thereby increasing the chance of dust-entering.

According to the front panel assembly as discussed in above, the slidable cover can increase the visual effect of the computer case.

In addition, with the assist of the torsion spring or the restoring member, the slidable cover is able to be sprung to desired positions, thereby improving operability and convenience for users.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A front panel assembly adapted for a computer case, comprising:
   a frame having at least one first slide groove;
   a slidable cover, slidably disposed on the frame and slidable between a covering position and an exposing position, wherein the slidable cover comprises a covering part and at least one first sliding part, the at least one first sliding part is located at a side of the covering part facing the frame and is slidably disposed in the at least one first slide groove;
   at least one torsion spring, connected to and located between the frame and the slidable cover so as to provide elastic energy to spring the slidable cover to the covering position or the exposing position while the slidable cover is slide on the frame; and
   at least one attachment, wherein the at least one attachment and the covering part of the slidable cover are respectively located at two opposite surfaces of the frame, and the covering part is fixed to the at least one attachment via the at least one first sliding part.

2. The front panel assembly according to claim 1, wherein the at least one torsion spring has a released state and a pressed state, the slidable cover is further slidable to a middle position which is located between the covering position and the exposing position;
   when the slidable cover is in the covering position or the exposing position, the at least one torsion spring is in the released state; when the slidable cover is in the middle position, the at least one torsion spring is in the pressed state so as to store the elastic energy.

3. The front panel assembly according to claim 1, wherein the frame has an input/output interface; when the slidable cover is in the covering position, the slidable cover covers the input/output interface; when the slidable cover is in the exposing position, the slidable cover exposes the input/output interface.

4. The front panel assembly according to claim 1, wherein the at least one torsion spring has a fixed end and a movable end opposite to each other, the fixed end is fixed to the frame, the movable end is fixed to the slidable cover; when the slidable cover is in the covering position, the fixed end and the movable end are spaced by a first distance; when the slidable cover is in the exposing position, the fixed end and the movable end are spaced by a second distance, and the first distance is larger than the second distance.

5. The front panel assembly according to claim 4, when the frame has at least one first slide groove, the slidable cover includes a covering part and at least one first sliding part, the at least one first sliding part is located at a side of the covering part facing the frame and is slidably disposed in the at least one first slide groove.

6. The front panel assembly according to claim 5, wherein the at least one first slide groove has a first end and a second end opposite to each other, and a distance between the fixed end of the at least one torsion spring and the first end is different from a distance between the fixed end and the second end.

7. The front panel assembly according to claim 1, wherein the quantity of the at least one torsion spring is two, the torsion springs are respectively located at two opposite sides of the frame so as to spring the slidable cover to the covering position or the exposing position while the slidable cover is sliding on the frame.

8. The front panel assembly according to claim 4, wherein the frame has a top surface, the slidable cover is further slidable to a middle position which is located between the covering position and the exposing position; while the slidable cover is sliding from the covering position to the middle position, a change of a distance between the movable end and the top surface and a change of an angle of the at least one torsion spring are in inverse proportion; while the slidable cover is sliding from the middle position to the exposing position, the change of the distance between the movable end and the top surface and the change of the angle of the at least one torsion spring are in proportion.

9. A front panel assembly adapted for a computer case, comprising:
- a frame, having an input/output interface and at least one first slide groove;
- a slidable cover, slidably disposed on the frame and slidable between a covering position and an exposing position, wherein the slidable cover comprises a covering part and at least one first sliding part, the at least one first sliding part is located at a side of the covering part facing the frame and is slidably disposed in the at least one first slide groove;
- a first torsion spring, connected to and located between the frame and the slidable cover;
- a second torsion spring, connected to and located between the frame and the slidable cover;
- wherein, the first torsion spring and the second torsion spring are respectively disposed on two opposite sides of the frame so as to provide elastic energy to spring the slidable cover to the covering position or the exposing position; when the slidable cover is in the covering position, the slidable cover covers the input/output interface; when the slidable cover is in the exposing position, the slidable cover exposes the input/output interface; and
- at least one attachment, wherein the at least one attachment and the covering part of the slidable cover are respectively located at two opposite surfaces of the frame, and the covering part is fixed to the at least one attachment via the at least one first sliding part.

10. A front panel assembly adapted for a computer case, comprising:
- a frame having at least one first slide groove;
- a slidable cover, slidably disposed on the frame along a slide direction, wherein the slidable cover comprises a covering part and at least one first sliding part, the at least one first sliding part is located at a side of the covering part facing the frame and is slidably disposed in the at least one first slide groove; and
- at least one restoring member, disposed between the frame and the slidable cover so as to provide a first restoring force or a second restoring force on the slidable cover, the first restoring force is used to keep the slidable cover in a covering position to press against the frame, and the second restoring force is used to keep the slidable cover in an exposing position to press against the frame;
- wherein a direction of the first restoring force, a direction of the second restoring force and the slide direction are coplanar; and
- at least one attachment, wherein the at least one attachment and the covering part of the slidable cover are respectively located at two opposite surfaces of the frame, and the covering part is fixed to the at least one attachment via the at least one first sliding part.

11. The front panel assembly according to claim 10, wherein the frame has an input/output interface; when the slidable cover is in the covering position, the slidable cover covers the input/output interface; when the slidable cover is in the exposing position, the slidable cover exposes the input/output interface.

12. The front panel assembly according to claim 10, wherein the quantity of the at least one restoring member is two, one of the restoring members is configured to provide the first restoring force or the second restoring force to the slidable cover, and the other restoring member is configured to provide a third restoring force or a fourth restoring force to the slidable cover, the third restoring force is used to keep the slidable cover in the covering position, the fourth restoring force is used to keep the slidable cover in the exposing position, wherein the direction of the first restoring force, the direction of the second restoring force, a direction of the third restoring force, a direction of the fourth restoring force and the slide direction of the slidable cover are coplanar.

* * * * *